US008479793B2

(12) United States Patent
Yoshikawa et al.

(10) Patent No.: US 8,479,793 B2
(45) Date of Patent: Jul. 9, 2013

(54) PNEUMATIC TIRE

(75) Inventors: Yusuke Yoshikawa, Kodaira (JP); Makoto Tsuruta, Akishima (JP)

(73) Assignee: Bridgestone Corporation, Tokyo (JP)

( * ) Notice: Subject to any disclaimer, the term of this patent is extended or adjusted under 35 U.S.C. 154(b) by 776 days.

(21) Appl. No.: 12/520,962

(22) PCT Filed: Dec. 26, 2007

(86) PCT No.: PCT/JP2007/075025
§ 371 (c)(1),
(2), (4) Date: Aug. 26, 2009

(87) PCT Pub. No.: WO2008/078794
PCT Pub. Date: Jul. 3, 2008

(65) Prior Publication Data
US 2010/0024946 A1 Feb. 4, 2010

(30) Foreign Application Priority Data

Dec. 26, 2006 (JP) ................................. 2006-349481
Feb. 22, 2007 (JP) ................................. 2007-041811

(51) Int. Cl.
*B60C 9/22* (2006.01)
(52) U.S. Cl.
USPC ........................... 152/531; 152/536; 152/527
(58) Field of Classification Search
USPC ....................................................... 152/531
IPC ........................................................ B60C 9/22
See application file for complete search history.

(56) References Cited

U.S. PATENT DOCUMENTS 5,746,853 A    5/1998  Burlacot
6,315,019 B1 * 11/2001  Garlaschelli et al. ......... 152/527

(Continued)

FOREIGN PATENT DOCUMENTS

EP           422881 A2 *   4/1991
JP         02-208101 A     8/1990

(Continued)

OTHER PUBLICATIONS

English Language Machine Translation of JP06-032110, 1994.*

(Continued)

*Primary Examiner* — Justin Fischer
*Assistant Examiner* — Philip N Schwartz
(74) *Attorney, Agent, or Firm* — Sughrue Mion, PLLC

(57) ABSTRACT

The present invention provides a tire with a belt having relatively high durability by improving fatigue resistance of cords at end portions of a circumferential belt layer, in particular, and especially proposes a radial tire for heavy load, having a relatively small aspect ratio. For this purpose, the present invention provides a tire having a carcass as a skeleton provided in a toroidal shape over a pair of bead portions, a belt disposed on the outer side in the radial direction of the carcass, and a tread disposed on the outer side in the radial direction of the belt, the belt including: at least one layer of circumferential belt layer disposed on the outer side in the radial direction of a crown portion of the carcass and formed of a number of cords extending along the equatorial plane of the tire and coating rubber thereon; and at least two layers of slant belt layers disposed on the circumferential belt layer and each formed of a number of cords extending in a direction inclined with respect to the equatorial plane O of the tire and coating rubber thereon, characterized in that: a width of the circumferential belt layer is no less than 60% of the total width of the tire; a width of at least one of the slant belt layers is wider than the width of the circumferential belt layer; and modulus of elasticity of first cords disposed on an end portion side in the widthwise direction of the circumferential belt layer is lower than modulus of elasticity of second cords disposed on the inner side in the widthwise direction of the first cords.

24 Claims, 3 Drawing Sheets

U.S. PATENT DOCUMENTS

| | | | |
|---|---|---|---|
| 6,343,636 B1 * | 2/2002 | Hanya et al. | 152/209.24 |
| 2001/0001403 A1 | 5/2001 | Tsuruta et al. | |
| 2004/0226641 A1 * | 11/2004 | Akiyama et al. | 152/451 |
| 2006/0130949 A1 * | 6/2006 | Nakamura | 152/209.11 |

FOREIGN PATENT DOCUMENTS

| | | |
|---|---|---|
| JP | 06-032110 A | 2/1994 |
| JP | 09-183302 A | 7/1997 |
| JP | 2000-062411 A | 2/2000 |
| JP | 2005-350023 A | 12/2005 |
| JP | 2007-022283 A | 2/2007 |

OTHER PUBLICATIONS

Japanese Office Action issued in Japanese Application No. 2006-349481; dated Apr. 5, 2011.

Extended European Search Report dated Sep. 19, 2012 for Application No. 07860254.7-2425.

* cited by examiner

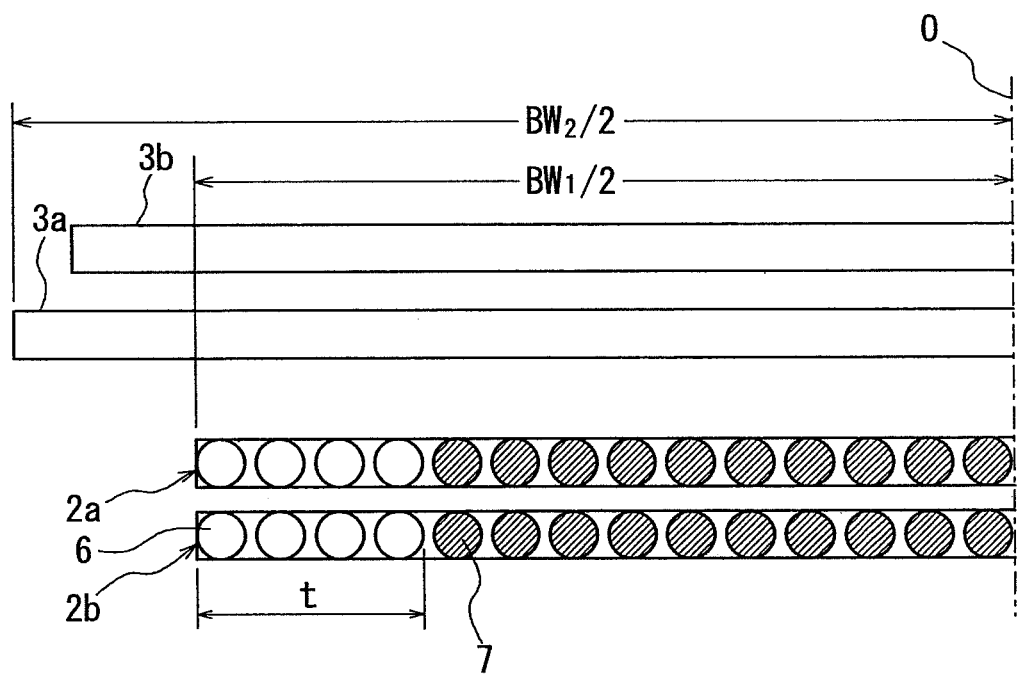

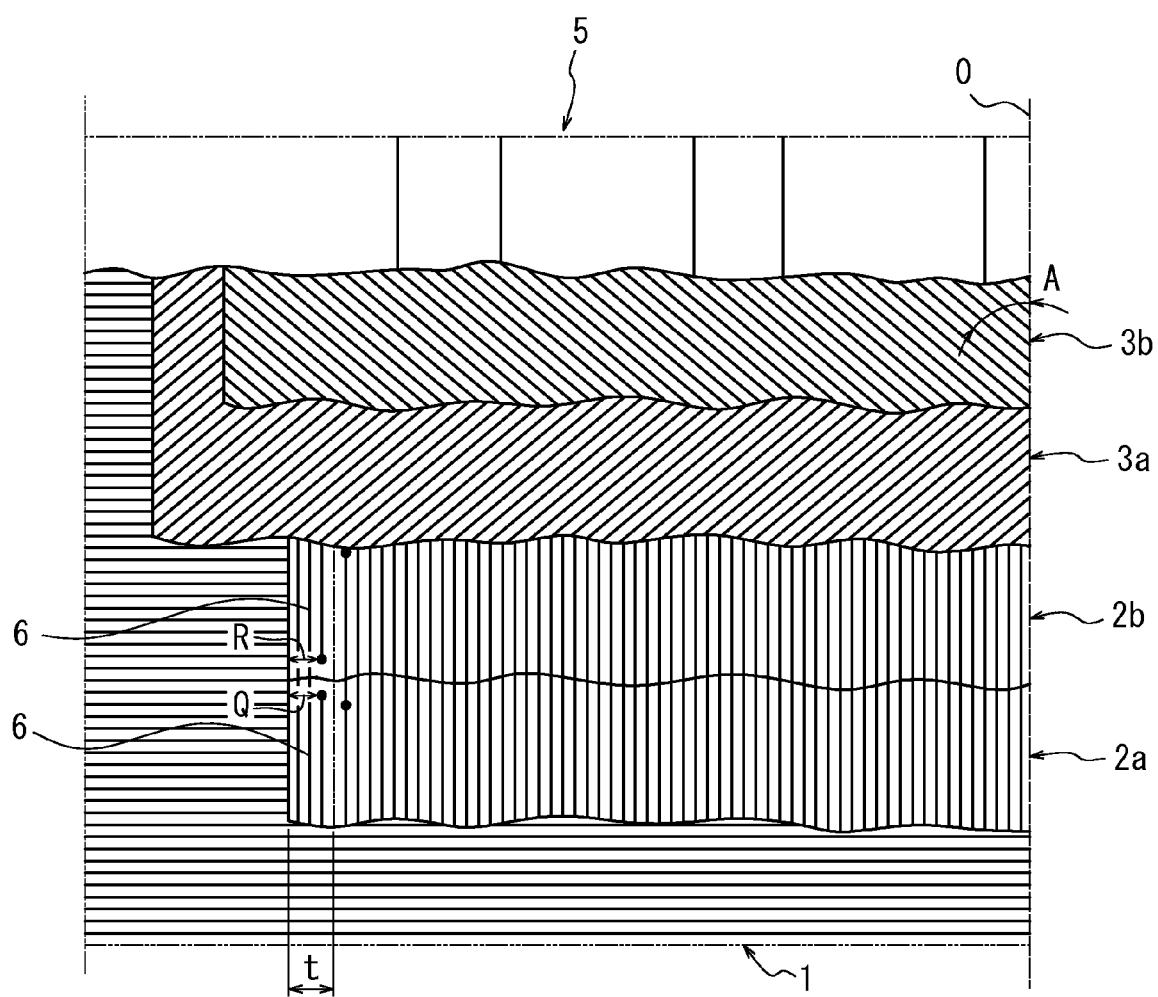

PNEUMATIC TIRE

TECHNICAL FIELD

The present invention relates to a pneumatic tire having as a belt a circumferential belt layer in which a reinforcing element such as a cord or a filament extends in a direction along the equatorial plane of a tire.

PRIOR ART

Regarding a belt for reinforcing a carcass of a tire, JP-A 02-208101 discloses a structure having: at least two layers of intersecting belt provided around a carcass, the intersecting layer including as a reinforcing element a number of cords or filaments intersecting with each other with interposing the equatorial plane of the tire therebetween at an inclination angle in the range of 10 to 40° with respect to the equatorial plane; and at least one layer of crown reinforcing layer located under the interesting belt and made of a strip in which a reinforcing element such as a number of wavy or zigzag-shaped cords or filaments are disposed as a whole along the equatorial plane.

DISCLOSURE OF THE INVENTION

Problems to be solved by the Invention

In recent years, due to a demand for high speed capacity and low chassis floor position in a vehicle, a tire to be mounted in a vehicle is made increasingly flatter, whereby the magnitude of radial expansion of a tread portion when the tire is inflated at the standard inner pressure tends to increase accordingly. Such an increase in the magnitude of radial expansion at the tread portion as this amplifies stress concentration at a belt end portion and causes durability at the belt end portion to deteriorate, becoming in particular a factor of early occurrence of belt end separation.

Specifically, a tire having a relatively small aspect ratio has a problem in that the magnitude of radial expansion in the tread portion, in the vicinity of a shoulder portion, in particular, at the standard inner pressure is significantly large. In view of this, there has been proposed a technique for suppressing tire radial expansion by a circumferential belt layer including an reinforcing element arranged in the tire circumferential direction by JP-A 02-208101, for example.

However, in a case where the aspect ratio of a tire is made relatively small, specifically, in a case where the aspect ratio, which is a ratio obtained by tire sectional height/tire sectional width, is 0.70 or less, it will be difficult to suppress tire radial expansion as desired unless the width of the circumferential belt layer is increased. Increasing the width of the circumferential belt layer, however, then would cause new problems as described below.

Specifically, in a case where the width of the circumferential belt layer is increased, as the tire is driven to run, the end portions in the widthwise direction of the circumferential belt layer is bending-deformed in the circumferential direction in the ground-contact region such that the belt layer is elongated in the circumferential direction, whereby tension input (which will be referred to as "tension amplitude input" hereinafter) is repeatedly and strongly applied on the end portions in the widthwise direction of the circumferential belt layer. As a result, the cords become susceptible to fatigue fracture at the end portions in the widthwise direction of the circumferential belt layer. If the cords of the circumferential belt layer are fatigue-fractured, the circumferential belt layer can no longer support the tension in the circumferential direction, whereby the tire can no longer maintain the shape thereof and is out of use.

In view of the problem described above, an object of the present invention is to provide a pneumatic tire provided with a belt having high durability, in particular, a radial tire for heavy load having a relatively small aspect ratio, by improving fatigue resistance of cords used in an end portion of a circumferential belt layer.

Means for solving the Problems

The most serious problem which arises when the width of a circumferential belt layer is increased is fatigue fracture of cords in an end portion in the widthwise direction of the circumferential belt layer. This fatigue fracture occurs due to tension amplitude inputs acting on the cords of the end portions of the circumferential belt layer as the tire is driven to run. Therefore, suppressing a tension amplitude input is essential to solve the aforementioned problem.

In view of this, as a result of a keen study of means for suppressing the tension amplitude input, it has turned out that adjusting modulus of elasticity of cords embedded in the circumferential belt layer is very effective to suppress fatigue fracture of the cords.

Specifically, the key structural aspects of the present invention are as follows.

(1) A tire having a carcass as a skeleton provided in a toroidal shape over a pair of bead portions, a belt disposed on the outer side in the radial direction of the carcass, and a tread disposed on the outer side in the radial direction of the belt, the belt including: at least one layer of circumferential belt layer disposed on the outer side in the radial direction of a crown portion of the carcass and formed of a number of cords extending along the equatorial plane of the tire and coating rubber thereon; and at least two layers of slant belt layers disposed on the circumferential belt layer and each formed of a number of cords extending in a direction inclined with respect to the equatorial plane O of the tire and coating rubber thereon, is characterized in that:

a width of the circumferential belt layer is no less than 60% of the total width of the tire;

a width of at least one of the slant belt layers is wider than the width of the circumferential belt layer; and modulus of elasticity of first cords disposed on an end portion side in the widthwise direction of the circumferential belt layer is lower than modulus of elasticity of second cords disposed on the inner side in the widthwise direction of the first cords.

(2) The pneumatic tire of the first aspect (1) is characterized in that the cords of the circumferential belt layer is made of steel.

(3) The pneumatic tire of the first aspect (1) is characterized in that the first cords disposed on the end portion side in the widthwise direction, of the circumferential belt layer, are tensile metal cords having imaged elongation and the second cords disposed on the inner side in the widthwise direction of the first cords are non-elongation metal cords formed to a linear, wavy or zigzag shape.

(4) The pneumatic tire of the first aspect (1) is characterized in that the first cords disposed on the end portion side in the widthwise direction, of the circumferential belt layer, are tensile cords having unaged elongation and the second cords disposed on the inner side in the widthwise direction of the first cords are cords formed to a wavy or zigzag shape.

(5) The pneumatic tire of the first aspect (1) is characterized in that the first cords disposed on the end portion side in the widthwise direction, of the circumferential belt layer, are organic fiber cords and the second cords disposed on the inner side in the widthwise direction of the first cords are metal cords.

(6) The pneumatic tire of the first aspect (1) is characterized in that the circumferential belt layer is formed by spirally winding, on the crown portion of the carcass, a strip material formed of at least one cord and coating rubber thereon.

(7) The pneumatic tire of the first aspect (1) is characterized in that the width of each portion on the end portion side in the widthwise direction, of the circumferential belt layer, having relatively low modulus of elasticity is 5 to 20% of the total width of the circumferential belt layer.

(8) The pneumatic tire of the first aspect (1) is characterized in that modulus of elasticity at 1.8% tensile strain of the first cords disposed on the end portion side in the widthwise direction, of the circumferential belt layer, is in the range of 40 to 100 GPa and modulus of elasticity at 1.8% tensile strain of the second cords disposed on the inner side in the widthwise direction of the first cords is in the range of 80 to 210 GPa.

(9) The pneumatic tire of the first aspect (1) is characterized in that each portion on the end portion side in the widthwise direction, of the circumferential belt layer, having relatively low modulus of elasticity of the first cords is formed by spirally winding the cords.

(10) The pneumatic tire of the ninth aspect (9) is characterized in that the winding start end and the winding terminal end of the first cords are positioned on the inner side in the widthwise direction than each outermost end in the widthwise direction of the circumferential belt layer.

EFFECT OF THE INVENTION

According to the present invention, it is possible to increase the width of the circumferential belt layer, suppress radial expansion of a tread portion of a tire having a relatively small aspect ratio, in particular, and also suppress fatigue fracture of cords in the circumferential belt layer. As a result, it is possible to provide a tire having a relatively small aspect ratio, of which belt durability performance is significantly improved.

Further, according to the structure as recited in the aforementioned eighth aspect (8) of the present invention, it is possible to strongly suppress fracture of the cords provided on the widthwise direction outer side, with effectively suppressing radial expansion of the tread end portion due to inflation of the tire at the standard inner pressure.

Further, according to the structure as recited in the aforementioned second aspect (2) of the present invention, it is possible to strongly suppress radial expansion of the tread end portion due to inflation of the tire at the standard inner pressure. Yet further, according to the structure as recited in the aforementioned ninth aspect (9) of the present invention, it is possible to reliably shape the widthwise outer side region of a reinforcing ply with high efficiency.

Yet further, according to the structure as recited in the aforementioned tenth aspect (10) of the present invention, the winding start end and the winding terminal end as the cut ends of the widthwise outer side reinforcing cords are prevented by the reinforcing cords disposed on further outer side in the widthwise direction than these ends, from being exposed, whereby cracks and separation starting from the winding start end or the winding terminal end can be prevented.

BEST MODE FOR CARRYING OUT THE INVENTION

The tire according to the present invention will be described in detail with reference to FIG. 1 showing a section in the widthwise direction of the tire. Specifically, In FIG. 1, the tire has: a carcass 1 provided in a toroidal shape over a pair of bead portions (not shown); a belt 4 disposed on the outer side in the radial direction of the carcass, the belt including at least one layer (two layers in the example shown in the drawing) of circumferential belt layer 2a and 2b disposed on the outer side in the radial direction of a crown portion of the carcass 1 and formed of a number of cords extending along the equatorial plane O of the tire and coating rubber thereon, and at least two layers (two layers in the example shown in the drawing) of slant belt layers 3a and 3b disposed on the circumferential belt layer such that the cords in one layer 3a intersect with the cords in another layer 3b and each layer is formed of a number of cords extending in a direction inclined with respect to the equatorial plane O of the tire and coating rubber thereon; and a tread 5 disposed on the outer side in the radial direction of the belt 4.

In the present embodiment, the width BW1 of the circumferential belt layer 2a and 2b needs to be set no less than 60% of the total width TW of the tire and narrower than the width of the adjacent slant belt layer. First, in order to suppress radial expansion of the tread within a certain range when the tire is inflated at the standard inner pressure, the width of the circumferential belt layer need be at least 60% of the total width TW of the tire because the region exhibiting relatively large radial expansion, which is a region covering 60 to 70% of the total width TW of the tire, must be provided with circumferential rigidity for suppressing radial expansion. The upper limit of the width BW1 of the circumferential belt layer 2a and 2b is preferably 90% due to constraints from the tire shape.

Further, the width of at least one layer of the slant belt layer (the width BW2 of the slant belt layer 3a in the example shown in the drawing) need be wider than the width of the circumferential belt layer 2b in order to ensure in-plane sheer rigidity of the tread portion required for satisfactory resistance to wear and cornering performance of the tire.

In the example as shown in FIG. 1, the width of the circumferential belt layer 2a and the width of the circumferential belt layer 2b are the same. However, these widths may be different from each other. In particular, in a case where the strength at the widthwise center portion of the circumferential belt layer is increased, it is acceptable that the width of one circumferential belt layer is made relatively wide and the width of the other circumferential belt layer is made relatively narrow.

The width of the other slant belt layer 3b is preferably designed to be wider than the circumferential belt layer in terms of improving in-plane sheer rigidity of the tread portion and thus improving, in particular, resistance to wear of the tire. In the example as shown in FIG. 1, the width of the slant belt layer 3a is wider than the width of the slant belt layer 3b. In a case where the widths of these slant belt layers are the same, steep change in rigidity is resulted, whereby there is a concern that resistance to separation at the belt layer end portions may deteriorate.

In a case where the width of the circumferential belt layer is made relatively large, fatigue fracture of cords is more likely to occur at the outer end portions in the widthwise direction of the circumferential belt layer, whereby it is difficult to gain a satisfactorily long tire product life. Fatigue fracture in the cords at the outer end portions in the widthwise direction of the circumferential belt layer occurs because amplitude inputs in tensile directions are exerted on the cords at the outer end portions in the widthwise direction of the circumferential belt layer as the tire is driven to run. Therefore, suppressing these tension amplitude inputs is essential to solve the problem. In view of this, in the present invention, at the end portions in the widthwise direction of the circumferential belt layer, modulus of elasticity of first cords disposed on the outer side in the widthwise direction of the circumferential belt layer is set lower than modulus of elasticity of second cords disposed on the inner side in the widthwise direction of the first cords, so that the tensile amplitude inputs concentrating on the end portions in the widthwise direction of the circumferential belt layer are suppressed.

Specifically, in a tire running on the ground, tension amplitude inputs are exerted on the end portions in the widthwise direction of the circumferential belt layer. These tension amplitude inputs occur because the cords are elongated in the circumferential direction and the maximum tensile stress is exerted thereon at a ground-contact surface on the tread end portion sides of the tire, while the tensile stress corresponding to that when the tire is inflated at the standard inner pressure is exerted on the non-contact region of the tread end portion. Reducing the load applied on the tire, i.e. reducing the magnitude of flex in the tire, may be considered as a method of suppressing the amplitude of the tensile stress, but this method is not compatible with good ride comfort of the tire.

When cords are elongated in the tire circumferential direction in the ground contact surface, if modulus of elasticity is relatively low at the end portions in the widthwise direction of the circumferential belt layer corresponding to the ground contact surface, the tensile stress exerted on the cords is relatively low. However, in this case, if modulus of elasticity of all of the cords in the circumferential belt layer is made unanimously lowered, the magnitude of radial expansion when the tire is inflated at the standard inner pressure increases and it is difficult to maintain the shape of the tire. Therefore, by setting modulus of elasticity of the first cords disposed on the outer end side in the widthwise direction of the circumferential direction lower than modulus of elasticity of the second cords disposed on the inner side in the widthwise direction of the first cords, the distribution of increase in radial expansion when the tire is inflated at the standard inner pressure is made as even as possible, whereby the stress amplitude at the end portions in the widthwise direction of the circumferential belt layer in a ground contact surface is effectively suppressed and fatigue fracture of the cords can be suppressed.

Setting the modulus of elasticity of the (first) cords disposed on the outer side in the widthwise direction of the circumferential belt layer at 0.3 to 0.8 times as much as the modulus of elasticity of the (second) cords disposed on the inner side in the widthwise direction of the first cords is effective to suppress amplitude of the tensile stress described above.

The width t of the portion each disposed on the end portion side in the widthwise direction of the circumferential belt layer, which portion has relatively low modulus of elasticity (see FIG. 1), is preferably 5 to 20% of the total width of the circumferential belt layer. In a case where the aforementioned width t of the portion on the widthwise end portion side is less than 5% of the total width of the circumferential belt layer, fracture is still likely to happen because cords having relatively high modulus of elasticity exist in the region where the stress amplitude exerted on the circumferential belt layer is relatively large. In a case where the aforementioned width t exceeds 20% of the total width of the circumferential belt layer, it is difficult to suppress increase in radial expansion of the tire.

In the present embodiment, "setting the modulus of elasticity of the (first) cords disposed on the outer or end portion side in the widthwise direction of the circumferential belt layer lower than the modulus of elasticity of the (second) cords disposed on the inner side in the widthwise direction of the first cords" specifically represents fittingly disposing cords 6 and cords 7 having different moduli of elasticity, as shown in a plan development view of the circumferential belt layer of FIG. 1 and a widthwise direction sectional view of the circumferential belt layer of FIG. 2.

Specifically, in the cord arrangement shown as the circumferential belt layers 2a, 2b in FIG. 1 and FIG. 2, plural cords 6 having relatively low modulus of elasticity (low elastic modulus cords) are disposed on the end portion side in the widthwise direction of the circumferential belt layer and plural high elastic modulus cords 7 having higher modulus of elasticity than the cords 6 are disposed on belt-widthwise direction inner side of the circumferential belt layer 6.

Examples of the basic arrangement of the circumferential belt layer according to the present invention include disposing one to a few dozen of the low elastic modulus cords 6 on the widthwise end portion side of the circumferential belt layer and the high elastic modulus cords 7 on the widthwise direction inner side thereof.

It is known that the tensile strain in the ground contact surface is approximately 1.8% from actually measured values. Therefore, it is important that the moduli of elasticity of the cords prescribe the modulus of elasticity of the cords at tensile strain of 1.8%.

For example, an elastic cord made of metal of multiple-twist structure (4×(0.28 mm+6×0.25 mm)), what is called a "high elongation cord", is suitable as the low elastic modulus cord. Such a high elongation cord as this can be produced, for example, by forming steel filaments which are to constitute the cord to a shape similar to that of the finished filaments in a twisted cord by applying in advance thereto a stress exceeding elasticity limit, prior to twisting the filaments, and then twisting the filaments. However, since the high elongation cord described above is expensive, it is not preferable to apply high elongation cords to the entire circumferential belt layer.

On the other hand, a cord subjected to wavy or zigzag forming (see the structure of the circumferential belt layer 2b in FIG. 1) or a metal non-elongation cord, i.e. a layer-twist cord of (3+9+15)×0.23 mm, is suitable for the high elastic modulus cord. The modulus of elasticity of a high elongation cord at tensile strain of 1.8% is generally lower than that of a wavy or zigzag-formed cord or a metal non-elongation cord. Alternatively, using an organic fiber cord as the low elastic modulus cord, and a metal cord as the high elastic modulus cord, can satisfy the conditions of the moduli of elasticity described above.

Regarding the modulus of elasticity of the low elastic modulus cord, the range of 40 to 100 GPa is suitable for making suppression of radial expansion when a tire is inflated at the standard inner pressure compatible with suppression of fatigue fracture at the end portions of the circumferential belt layer. Similarly, regarding the modulus of elasticity of the high elastic modulus cord, the range of 80 to 210 GPa is suitable for suppressing deterioration in riding comfort (related to vibration), while satisfactorily suppressing radial expansion of tread end portions due to tire inflation at the standard inner pressure.

In the present embodiment, "modulus of elasticity of a cord" represents a value obtained by: disassembling a pneumatic tire and collecting a cord in the rubber-coated state; carrying out a tensile test of the cord and making a stress-strain graph from the results of the test; and calculating a gradient (slope) of the tangent at strain of 1.8% in the graph and dividing the thus obtained value by the sectional area of the cord. The cords existing with unaged elongation inside a tire exhibits, when the cord is cut out of the tire, strain within the range of 1.8% of the length at which the cord existed inside the tire.

In FIG. 3, the region having the width t on the widthwise direction end portion side of the circumferential belt layer (the outer side region t) and the inner side region thereof described above can be structured, for example, by spirally winding plural times on the outer side of the carcass 1 a ribbon-shaped body having a constant width constituted of one or a relatively small number of juxtaposed cords 6 or 7 and coating rubber thereon. By forming the circumferential belt layer by spirally winding a ribbon-shaped body in such a manner, the aforementioned outer side region and the inner side region can be reliably formed at relatively high efficiency.

In the present embodiment, if the winding start end and the winding terminal end as the cut ends of the cords 6 are exposed at the outermost end in the widthwise direction of the outer region t of the circumferential belt layer when the circumferential direction belt layer has been formed by spirally winding of a ribbon-shaped body as described above, cracks and/or separation may be generated from the winding start end or the winding terminal end as the starting point. Therefore, in the present embodiment, both of the winding start end and the winding terminal end of the aforementioned cords 6 are preferably located on the inner side in the widthwise direction than the outermost end in the widthwise direction of the outer region t the circumferential belt layer, so that cracks and/or separation as described above can be prevented.

In order that both of the winding start end and the winding terminal end of the cords 6 in the outer region t of the circumferential belt layer are located on the inner side in the widthwise direction than the outermost end in the widthwise direction of the outer region t as described above, the aforementioned ribbon-shaped body is, for example, spirally wound from the inner end in the widthwise direction of the outer region t toward the outer side in the widthwise direction to the outermost end in the widthwise direction thereof, to form an outer region t of the circumferential belt layer on the inner side in the radial direction, and then the widthwise direction in which the ribbon-shaped body travels across the tread surface is reversed and the ribbon-shaped body is spirally wound from the outermost end in the widthwise direction of the outer region t toward the inner side in the widthwise direction to the inner end in the widthwise direction thereof, to form an outer region t of the circumferential belt layer 2b on the outer side in the radial direction.

EXAMPLES

The belt structure as shown in FIG. 1 was applied to the various specifications shown in Table 1, whereby tires for a truck or a bus of size 435/45R22.5 were produced for tests. Each of the tires thus obtained was assembled with a rim of size 14.00×22.5. After the inner pressure thereof was adjusted to 900 kPa, each tire was made to run 30,000 km on a drum under a drum load of 63.7 kN at the drum rotation rate of 60.0 km/h, followed by dissection of the tire and confirmation of the number of fatigue-fractured cords in the circumferential belt layer. The results are shown in Table 1 as index values corresponding to the value of the conventional example expressed as 100. The smaller index values represent the smaller number of fatigue-fractured cords and thus the better durability performance.

The "modulus of elasticity" in the examples of the present invention represents modulus of elasticity measured at tensile strain of 1.8% when each cord is subjected to a tensile test by an instron-type tensile machine, and modulus of elasticity of each cord is expressed as an index value with respect to the elastic modulus value of the cord of the conventional example expressed or converted as 100. The smaller index value represents the lower elastic modulus. Layer-twisted cords of (1+6)×0.32 mm were applied to the slant belt layers at the cord density of 24.5 cords/50 mm. High tensile cords of 4×(1×0.28 mm+6×0.25 mm) were applied to the end portions in the widthwise direction of the circumferential belt layer at the cord density of 20 cords/50 mm, while non-elongation wavy cords of (3+9+15)×0.23 mm were applied to the inner portions in the widthwise direction of the circumferential belt layer at the cord density of 22.5 cords/50 mm.

TABLE 1

|  | Conventional Example | Comparative Example | Example 1 | Example 2 | Example 3 | Example 4 | Example 5 |
|---|---|---|---|---|---|---|---|
| Total width of tire | 435 | 435 | 435 | 435 | 435 | 435 | 435 |
| Width (mm) of circumferential belt layer 2b | 300 | 300 | 300 | 300 | 300 | 300 | 300 |
| Width (mm) of slant belt layer 3b | 360 | 360 | 360 | 360 | 360 | 360 | 360 |
| Cord angle (deg) of slant belt layer 3b | 50 | 50 | 50 | 50 | 50 | 50 | 50 |
| Width (mm) of slant belt layer 3a | 330 | 330 | 330 | 330 | 330 | 330 | 330 |
| Cord angle (deg) of slant belt layer 3a | 50 | 50 | 50 | 50 | 50 | 50 | 50 |
| Elastic modulus (index) of low elastic modulus cord of circumferential belt layer | 100 | 120 | 90 | 80 | 60 | 80 | 60 |
| Elastic modulus (index) of high elastic modulus cord of circumferential belt layer | 100 | 100 | 100 | 100 | 120 | 120 | 120 |
| Width of low elastic modulus cord | 30 | 30 | 30 | 30 | 30 | 30 | 30 |
| Durability [against cord fatigue fracture: index] | 100 | 150 | 60 | 25 | 0 | 20 | 0 |

TABLE 1-continued

|  | Conventional Example | Comparative Example | Example 1 | Example 2 | Example 3 | Example 4 | Example 5 |
|---|---|---|---|---|---|---|---|
| Q (mm) | — | 30 | 30 | 30 | 30 | 0 | 0 |
| R (mm) | — | 30 | 30 | 30 | 30 | 0 | 0 |
| Belt durability evaluation (index) | 100 | 95 | 115 | 121 | 126 | 110 | 112 |

Further, the distance between the winding start end of the cords in the outer region t in each of the example tires according to the present invention and the corresponding end in the widthwise direction of the circumferential belt layer was expressed as Q (mm), and the distance between the winding terminal end of the cords and the same end in the widthwise direction of the circumferential belt layer was expressed as R(mm). These distance values are shown in Table 1. In the examples of the present invention, the values of Q and R being both zero means a structure formed by: starting winding of the cord in the outer region t from each outermost end in the widthwise direction of the circumferential belt layer; winding the cord toward the inner side in the widthwise direction by the width t of the outer region; and then reversing the widthwise direction in which the cord travels across the tread surface and winding the cord up to each outermost end in the widthwise direction of the circumferential belt layer, whereby the winding start end and the winding terminal end of the reinforcing cord in the outer region are exposed at each end in the widthwise direction of the circumferential belt layer.

Yet further, each of the tires described above was assembled with a rim having the size of 14.00×22.5. Each tire, after the inner pressure thereof was adjusted to 900 kPa, was pushed against a drum to be driven and run at the speed of 60 km/h with a load of 49.0 kN applied thereon until a failure due to separation occurred. The results (time counted prior to occurrence of the failure) are shown in Table 1 as index values corresponding to the value of the conventional example expressed as 100. The larger index values represent the better durability performance.

Industrial Applicability

The present invention is applicable to an industrial field of a pneumatic tire for heavy load, having a circumferential belt layer constituted of reinforcing cords embedded substantially in parallel to each other on the equatorial plane of the tire.

BRIEF DESCRIPTION OF THE DRAWINGS

FIG. 2 is a widthwise direction sectional view of a circumferential belt layer of the tire according to the present invention.

FIG. 3 is a development view of the belt of the tire according to the present invention.

EXPLANATION OF THE REFERENCE NUMERALS

Figure 1:
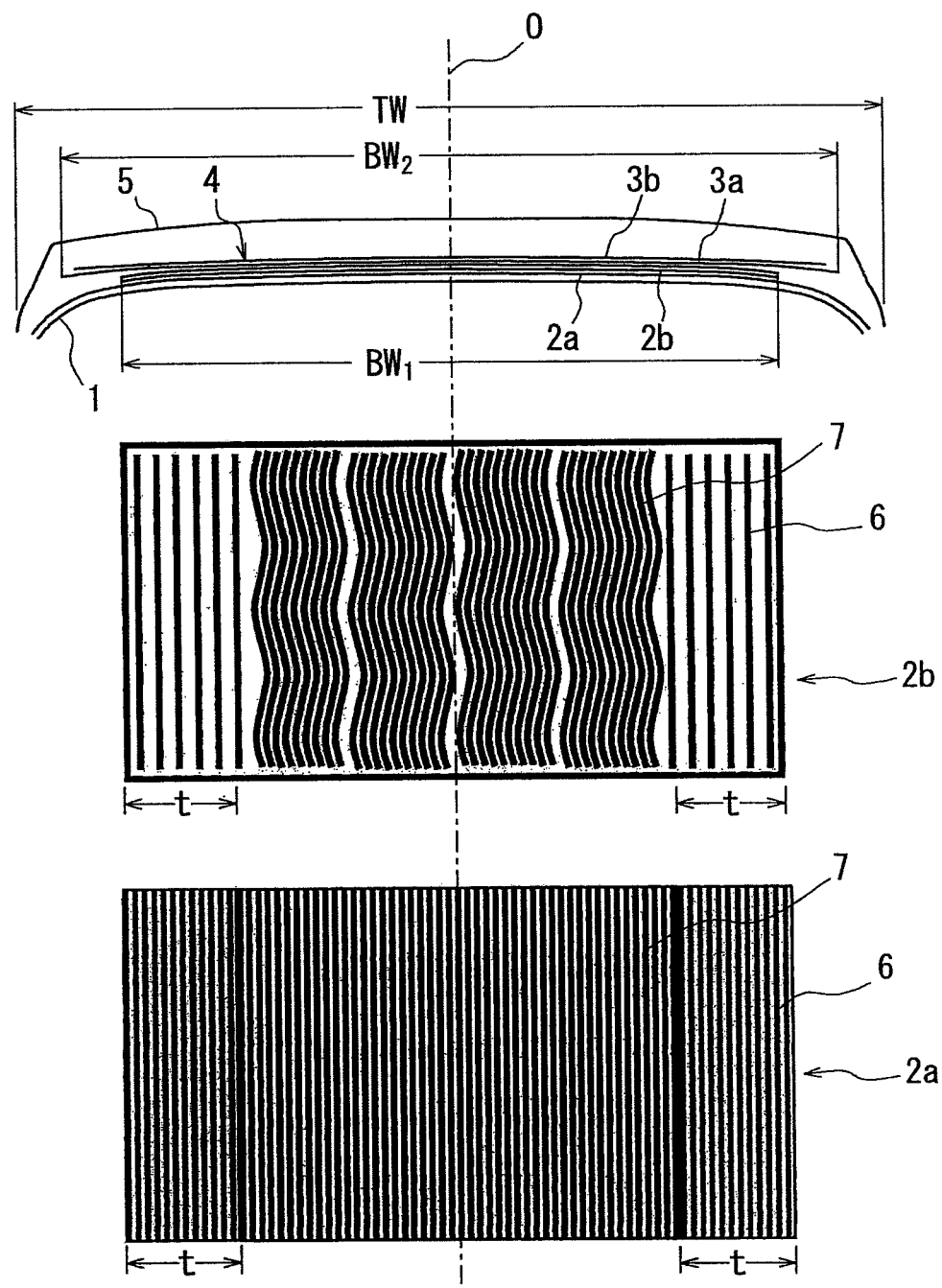
FIG. 1 is a widthwise direction sectional view of a tire and development views of a belt of the tire according to the present invention.

| 1 | Carcass |
| 2a, 2b | Circumferential belt layer |
| 3a, 3b | Slant belt layer |
| 4 | Belt |
| 5 | Tread |
| 6 | Low elastic modulus cord |
| 7 | High elastic modulus cord |
| O | Equatorial plane of tire |
| BW1 | Width of circumferential belt layers 2a and 2b |
| BW2 | Width of slant belt layer 3a |
| TW | Total width of tire |

The invention claimed is:

1. A tire having a carcass as a skeleton provided in a toroidal shape over a pair of bead portions, a belt disposed on the outer side in the radial direction of the carcass, and a tread disposed on the outer side in the radial direction of the belt, the belt comprising:
    at least one layer of circumferential belt layer disposed on the outer side in the radial direction of a crown portion of the carcass and formed of a number of cords extending along an equatorial plane of the tire and coating rubber thereon; and at least two layers of slant belt layers disposed on the circumferential belt layer and each formed of a number of cords extending in a direction inclined with respect to the equatorial plane of the tire and coating rubber thereon, characterized in that:
    a width of the circumferential belt layer is no less than 60% of the total width of the tire;
    a width of at least one of the slant belt layers is wider than the width of the circumferential belt layer; and
    modulus of elasticity of first cords disposed on an end portion side in the widthwise direction of the circumferential belt layer is lower than modulus of elasticity of second cords disposed on an inner portion side in the widthwise direction of the circumferential belt layer,
    wherein the cords of the circumferential belt layer are unanimously made of steel, and
    wherein the first cords disposed on the end portion side in the widthwise direction, of the circumferential belt layer, are tensile metal cords having unaged elongation and the second cords disposed on the inner portion side in the widthwise direction of the circumferential belt layer are non-elongation metal cords formed in a wavy or zigzag shape.

2. The pneumatic tire of claim 1, characterized in that the modulus of elasticity of the inner portion side of the circumferential belt layer is constant in the widthwise direction thereof.

3. The pneumatic tire of claim 1, characterized in that the circumferential belt layer is formed by spirally winding, on the crown portion of the carcass, a strip material formed of at least one cord and coating rubber thereon.

4. The pneumatic tire of claim 1, characterized in that the width of each portion on the end portion side in the widthwise direction, the circumferential belt layer, having relatively low modulus of elasticity is 5 to 20% of the total width of the circumferential belt layer.

5. The pneumatic tire of claim 1, characterized in that modulus of elasticity at 1.8% tensile strain of the first cords disposed on the end portion side in the widthwise direction, of the circumferential belt layer, is in the range of 40 to 100 GPa and modulus of elasticity at 1.8% tensile strain of the second cords disposed on the inner portion side in the widthwise direction of the circumferential belt layer is in the range of 80 to 210 GPa.

6. The pneumatic tire of claim 1, characterized in that each portion on the end portion side in the widthwise direction, of the circumferential belt layer, having relatively low modulus of elasticity of the first cords is formed by spirally winding the cords.

7. The pneumatic tire of claim 6, characterized in that a winding start end and a winding terminal end of the first cords are each positioned on the inner side in the widthwise direction relative to an outermost end in the widthwise direction of each end portion side of the circumferential belt layer.

8. The pneumatic tire of claim 1, wherein the width of each of the circumferential belt layers is equal.

9. The pneumatic tire of claim 1, wherein the width of each of the circumferential belt layers is different.

10. The pneumatic tire of claim 1, wherein the width of each of the circumferential belt layers is no more than 90% of the total width of the tire.

11. The pneumatic tire of claim 7, characterized in that the winding start end and the winding terminal end of the first cords are positioned on an end of the inner portion side in the widthwise direction of the circumferential belt layer and the outermost end in the widthwise direction of the circumferential belt layer.

12. The pneumatic tire of claim 1, wherein the belt comprises:
at least two layers of the circumferential belt layer.

13. A tire having a carcass as a skeleton provided in a toroidal shape over a pair of bead portions, a belt disposed on the outer side in the radial direction of the carcass, and a tread disposed on the outer side in the radial direction of the belt, the belt comprising:
at least one layer of circumferential belt layer disposed on the outer side in the radial direction of a crown portion of the carcass and formed of a number of cords extending along an equatorial plane of the tire and coating rubber thereon; and at least two layers of slant belt layers disposed on the circumferential belt layer and each formed of a number of cords extending in a direction inclined with respect to the equatorial plane of the tire and coating rubber thereon, characterized in that:
a width of the circumferential belt layer is no less than 60% of the total width of the tire;
a width of at least one of the slant belt layers is wider than the width of the circumferential belt layer; and
modulus of elasticity of first cords disposed on an end portion side in the widthwise direction of the circumferential belt layer is lower than modulus of elasticity of second cords disposed on an inner portion side in the widthwise direction of the circumferential belt layer,
wherein the cords of the circumferential belt layer are unanimously made of steel, and
wherein the first cords disposed on the end portion side in the widthwise direction, of the circumferential belt layer, are tensile cords having unaged elongation and the second cords disposed on the inner portion side in the widthwise direction of the circumferential belt layer are cords formed to a wavy or zigzag shape.

14. The pneumatic tire of claim 13, characterized in that the modulus of elasticity of the inner portion side of the circumferential belt layer is constant in the widthwise direction thereof.

15. The pneumatic tire of claim 13, characterized in that the circumferential belt layer is formed by spirally winding, on the crown portion of the carcass, a strip material formed of at least one cord and coating rubber thereon.

16. The pneumatic tire of claim 13, characterized in that the width of each portion on the end portion side in the widthwise direction, the circumferential belt layer, having relatively low modulus of elasticity is 5 to 20% of the total width of the circumferential belt layer.

17. The pneumatic tire of claim 13, characterized in that modulus of elasticity at 1.8% tensile strain of the first cords disposed on the end portion side in the widthwise direction, of the circumferential belt layer, is in the range of 40 to 100 GPa and modulus of elasticity at 1.8% tensile strain of the second cords disposed on the inner portion side in the widthwise direction of the circumferential belt layer is in the range of 80 to 210 GPa.

18. The pneumatic tire of claim 13, characterized in that each portion on the end portion side in the widthwise direction, of the circumferential belt layer, having relatively low modulus of elasticity of the first cords is formed by spirally winding the cords.

19. The pneumatic tire of claim 18, characterized in that a winding start end and a winding terminal end of the first cords are each positioned on the inner side in the widthwise direction relative to an outermost end in the widthwise direction of each end portion side of the circumferential belt layer.

20. The pneumatic tire of claim 13, wherein the width of each of the circumferential belt layers is equal.

21. The pneumatic tire of claim 13, wherein the width of each of the circumferential belt layers is different.

22. The pneumatic tire of claim 13, wherein the width of each of the circumferential belt layers is no more than 90% of the total width of the tire.

23. The pneumatic tire of claim 19, characterized in that the winding start end and the winding terminal end of the first cords are positioned on an end of the inner portion side in the widthwise direction of the circumferential belt layer and the outermost end in the widthwise direction of the circumferential belt layer.

24. The pneumatic tire of claim 13, wherein the belt comprises: at least two layers of the circumferential belt layer.

* * * * *